US011097400B2

(12) United States Patent
Ijspeert

(10) Patent No.: US 11,097,400 B2
(45) Date of Patent: Aug. 24, 2021

(54) HOLDING DEVICE USING A PLURALITY OF STACKED PLATES

(71) Applicant: IJSPEERT INNOVATIVE TECHNOLOGIES, Aïre-Geneva (CH)

(72) Inventor: Albert Jan Ijspeert, Aïre-Geneva (CH)

(73) Assignee: IJSPEERT INNOVATIVE TECHNOLOGIES, Aïre-Geneva (CH)

( * ) Notice: Subject to any disclaimer, the term of this patent is extended or adjusted under 35 U.S.C. 154(b) by 159 days.

(21) Appl. No.: 16/007,548

(22) Filed: Jun. 13, 2018

(65) Prior Publication Data

US 2018/0361541 A1 Dec. 20, 2018

(30) Foreign Application Priority Data

Jun. 14, 2017 (FR) ...................................... 1755369

(51) Int. Cl.
| | | |
|---|---|---|
| *B25B 1/24* | (2006.01) | |
| *B23Q 3/06* | (2006.01) | |
| *B25B 5/16* | (2006.01) | |
| *B25B 5/14* | (2006.01) | |
| *B25B 5/04* | (2006.01) | |

(52) U.S. Cl.
CPC .............. *B25B 5/163* (2013.01); *B23Q 3/062* (2013.01); *B23Q 3/063* (2013.01); *B25B 1/2421* (2013.01); *B25B 1/2426* (2013.01); *B25B 5/04* (2013.01); *B25B 5/14* (2013.01)

(58) Field of Classification Search
CPC ........... B25B 5/163; B25B 5/14; B25B 1/205; B25B 5/04; B25B 11/00; B25B 1/2421; B25B 24/26; B25B 1/2426; B25B 1/2415; B25B 1/241; B23Q 3/063; B23Q 3/062; B23B 31/16275

USPC .................................................. 269/266, 257
See application file for complete search history.

(56) References Cited

U.S. PATENT DOCUMENTS 1,397,409 A * 11/1921 Duwelius .............. B25B 1/2415
269/267
1,405,325 A * 1/1922 Posch .................... B25B 1/2426
269/258
4,691,905 A * 9/1987 Tamura ................ B23K 37/047
269/266

(Continued)

FOREIGN PATENT DOCUMENTS

DE 102009056812 A1 6/2011
EP 0104286 A1 4/1984
(Continued)

OTHER PUBLICATIONS

Search Report and Written Opinion for French Patent App. No. 1755369 (dated Mar. 7, 2018).

*Primary Examiner* — Lee D Wilson
*Assistant Examiner* — Mahdi H Nejad
(74) *Attorney, Agent, or Firm* — Kenealy Vaidya LLP

(57) ABSTRACT

Some embodiments are directed to a machine tool holding device for clamping a piece to be clamped that includes a contact surface. The holding device includes at least one claw intended to come into contact with the contact surface of the piece to be clamped. The claw includes a plurality of clamping plates stacked on each other, and each including on their edge a clamping surface arranged to be in contact with a portion of the contact surface of the piece to be clamped.

9 Claims, 5 Drawing Sheets

(56) References Cited

U.S. PATENT DOCUMENTS

| | | | | |
|---|---|---|---|---|
| 4,949,947 A | * | 8/1990 | Savoie | B25B 1/2405 |
| | | | | 269/203 |
| 4,969,638 A | * | 11/1990 | Yang | B25B 1/2426 |
| | | | | 269/258 |
| 5,799,933 A | * | 9/1998 | Yang | B25B 1/2426 |
| | | | | 269/258 |
| 6,152,435 A | * | 11/2000 | Snell | B25B 1/20 |
| | | | | 269/268 |
| 6,430,796 B1 | * | 8/2002 | Jones | B21J 15/10 |
| | | | | 29/243.53 |
| 6,557,600 B1 | * | 5/2003 | VeNard | B25B 1/2421 |
| | | | | 144/114.1 |
| 7,520,287 B2 | * | 4/2009 | Kozy | B08B 9/023 |
| | | | | 134/171 |
| 2005/0015962 A1 | * | 1/2005 | Sturm, Jr. | B23Q 1/035 |
| | | | | 29/468 |
| 2013/0334379 A1 | * | 12/2013 | McCallum | F16M 13/00 |
| | | | | 248/201 |
| 2015/0174706 A1 | | 6/2015 | McClure | |

FOREIGN PATENT DOCUMENTS

| | | |
|---|---|---|
| EP | 2 002 926 A1 * | 12/2008 |
| EP | 2002926 A1 | 12/2008 |
| EP | 2842725 A1 | 3/2015 |

\* cited by examiner

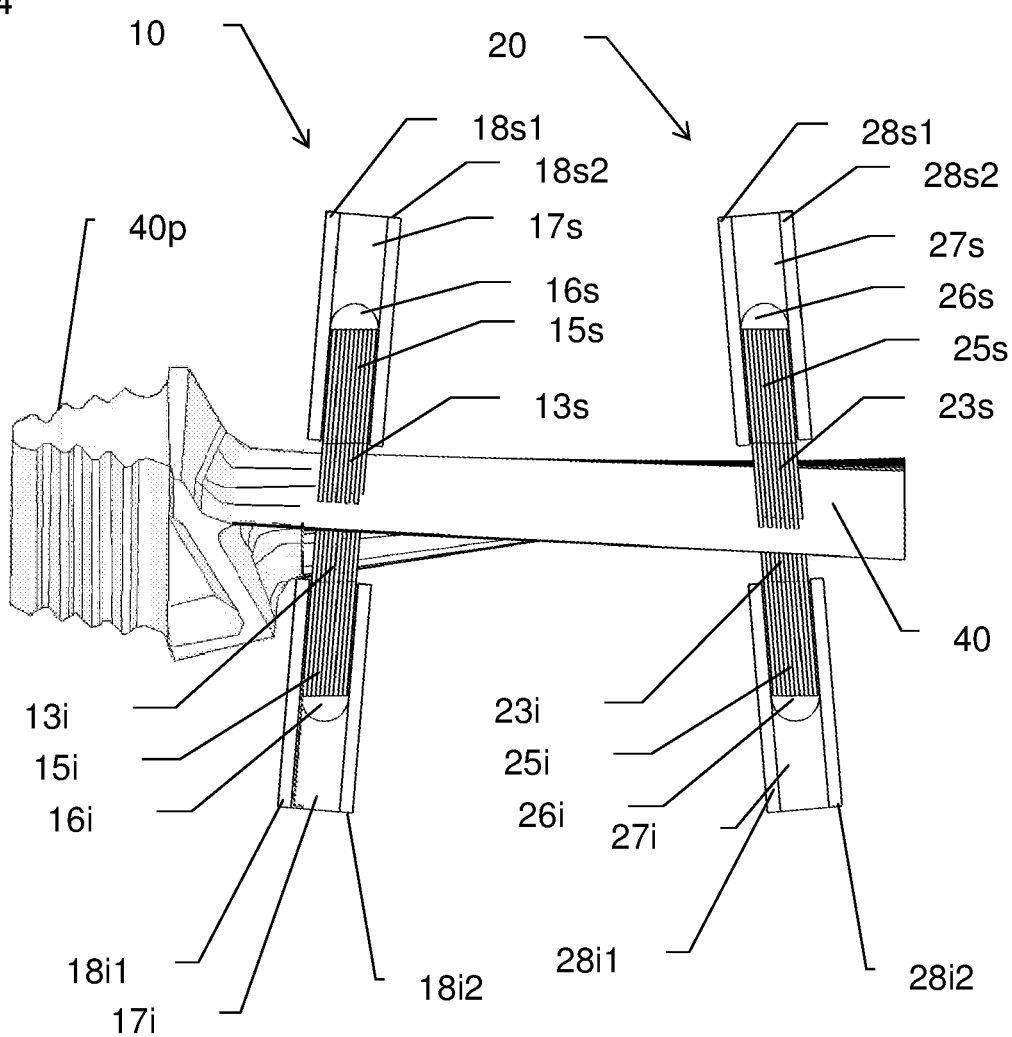

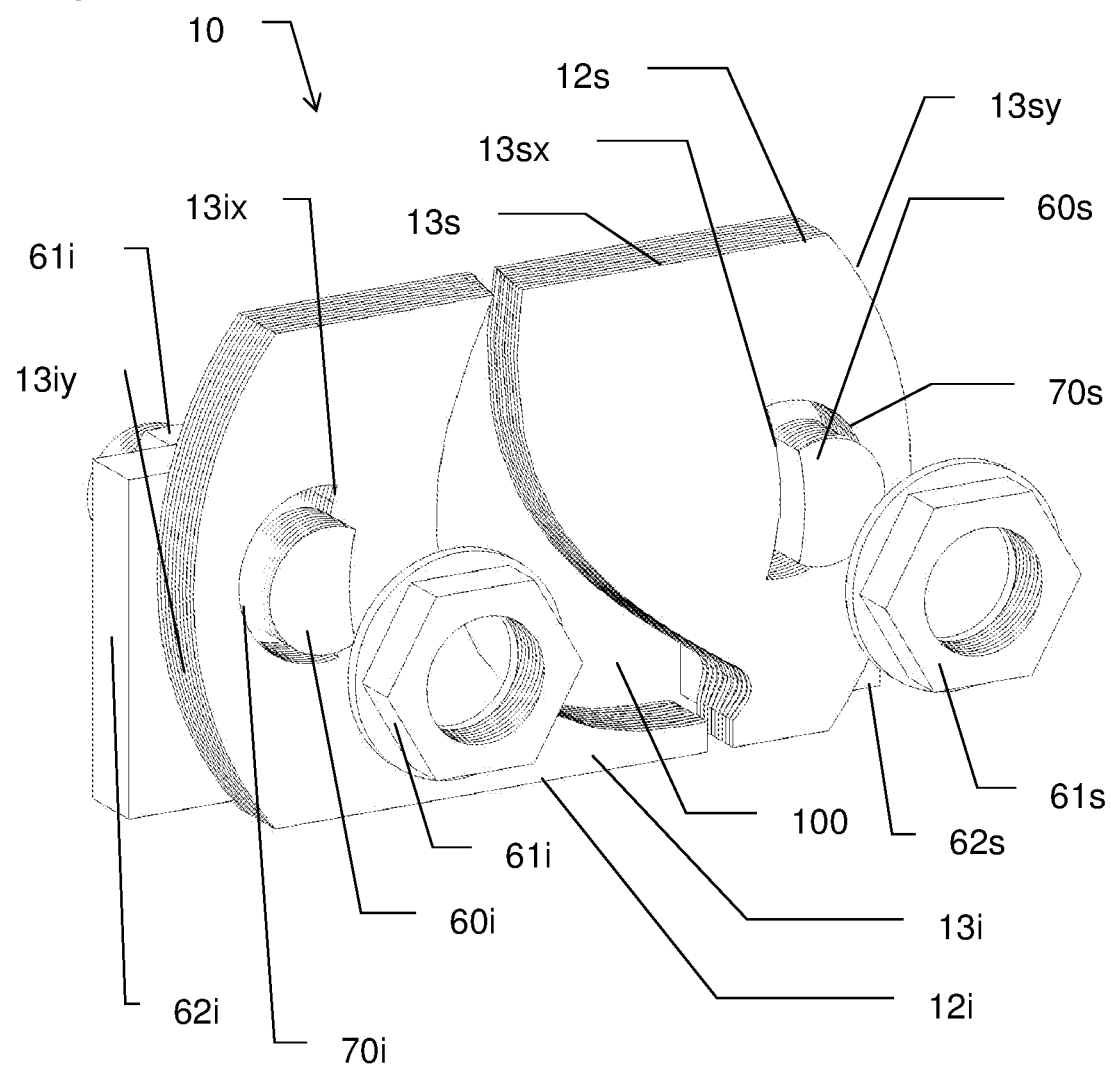

HOLDING DEVICE USING A PLURALITY OF STACKED PLATES

CROSS REFERENCE TO RELATED APPLICATION(S)

This application claims the priority benefit under 35 U.S.C. § 119 of French Patent Application No. 1755369, filed on Jun. 14, 2017, the content of which is hereby incorporated in its entirety by reference.

BACKGROUND

Some embodiments relate to machining and/or metrology, and in particular a device for holding a piece to be clamped, such as a blade or a propeller, or in general, of any object having a simple or complex shape, especially in the case of shapes with variable section.

Related art devices exist for clamping or holding an object.

The document CN105935851 discloses a device for holding an airplane or turbine engine blade, equipped with a plurality of clamping screws.

In return, this system has the particular disadvantage of tightening the part to be held on local points, which can cause local damage due to high contact pressures. In addition, it is desired in this embodiment to adjust one by one the clamping screws in order to achieve clamping the part, which is tedious and expensive and carries a significant risk of error.

The related art EP2842725A1 discloses a clamping tool with longitudinal plates that form a resin molding cavity, with transverse reinforcing plates.

SUMMARY

Some embodiments address some or all of the disadvantages of the related art mentioned above, and in particular, first of all, to provide a device for holding a piece to be clamped, that reduces, impedes, or avoids any damage. of the piece due to the contact with the holding device, while being quick to use.

Some embodiments relate to a holding device to clamp a piece to be clamped including a contact surface, the holding device including at least one jaw intended to come into contact with the contact surface of the part to be clamped, wherein the jaw includes a plurality of clamping plates stacked one on the other and each including on their edge a clamping surface arranged to be in contact with a portion of the contact surface of the piece to be clamped.

This makes it possible to provide an effective and inexpensive holding device, easily adaptable and with an optimized clamping surface. The holding device is therefore a device for holding or for clamping a piece to be clamped that is firmly held in order to be machined, or measured during a metrology operation. The plurality of plates makes it possible to increase the clamping surface in contact with the contact surface of the piece in order to reduce the contact pressure and to distribute it uniformly over the piece to be clamped, so as to be less aggressive and not to damage the material of the piece to be clamped. This makes it possible to prevent any damage to the piece to be clamped at the level of the contact with the holding device, in particular damage by matting, recession, indentation, scratching or bending.

A jaw means a part of a holding or clamping device, such as a vise, a mandrel, or a machine tool plate, that comes into contact with the piece to be clamped. A vise means an apparatus formed of two jaws, at least one of which is mobile, and whose clamping is affected manually or automatically, by means of a screw, by a pneumatic, hydraulic or mechanical device, such as a grasshopper or a bracing rod, which keeps in place a part or an object that one wants to work on. The claw is in general installed on or in the jaw and is advantageously or preferably movable to allow a rapid clamping action. A chuck means an apparatus attached to the nose of a machine tool or of some portable tools used to maintain or clamp a piece and in general to make it rotate. An edge means a thin rim of a thin object. A plate means a sheet, generally wider than it is thick, often rigid, and which may have recesses. It may also be a blade, such as a piece of metal or other hard, flat and narrow material. A stack means a pile of things placed or arranged one on top of the other, or a group of objects of the same kind stacked one on top of the other. The stacked parts may be in contact with one another or spaced apart by a spacer while forming a stack.

In other words, the plates arranged one on the other are independent of each other to allow relative movement between them (relative sliding or pivoting) and ensure contact of each of them with the piece to be clamped.

Advantageously, the holding device is arranged to be installed in a vise, a chuck or a machine tool tray.

Advantageously, the holding device is part of a tool of a machine tool, such as a machine tool for machining or metrology.

This allows providing a holding device suitable for use in tools conventionally available in a workshop or in the trade.

Advantageously, the holding device is part of a transport device.

This makes it possible to provide a holding device adapted to be used for the transport of pieces, in particular pieces of complex shape, fragile or of large shapes.

Advantageously, the plates have a thickness of less than 3 mm.

This makes it possible to provide a holding device with an optimized clamping surface, and allows a fast cutting or machining allowing the production of complex profiles in an inexpensive way. In fact, to cut the plates individually according to a profile corresponding to the part to be clamped is easy and fast, it is then sufficient to stack them to obtain the clamping claw which forms over a large area a counter-shape of the piece to be clamped.

Advantageously, the plates have a thickness of less than 1 mm.

This allows a better adaptation of the clamping surface. The choice of the thickness is in particular made so as to limit the risk of buckling of the plates, which can also be guided laterally for the same purpose.

Advantageously, the clamping plates are stacked along a direction of the thickness of each clamping plate.

This allows providing a range or a stack of plates with a large capacity of adaptation and of choice of clamping plates, with a great ease of implementation.

Advantageously, the clamping plates are stacked along a longitudinal direction of the piece to be clamped.

This makes it possible to provide an effective holding device adapted to a substantially longitudinal part, such as, for example, turbine blades.

Advantageously, the clamping surface of each plate has a specific contact profile forming a counter-shape of the portion of the contact surface of the piece to be clamped. In other words, at least two plates of the plurality of plates have a different clamping surface.

By counter-form is meant a form fitting exactly to the opposite shape or facing it. This also means a mirrored shape or a corresponding surface, especially through a continuity of contact. One can also consider a correspondence, a similarity or equality of the radii of curvature between the clamping surface of each plate and the corresponding portion of contact of the piece to be clamped. Each clamping surface of each edge is then individually in contact with a portion of the contact surface in a continuous way. The clamping surface is thus advantageously or preferably substantially rectangular and narrow in orthogonal projection, similar to a line, without being limited to such a shape.

This makes it possible to provide a holding device with the clamping surface most accurately adapted to the surface of the part to be clamped, so as to reduce the contact pressure and not to damage the part. It is a question of a distribution of loads as homogeneous as possible so as not to mark or damage the part to be clamped. However, each of the plurality of plates is previously cut individually, which may require a cutting machine (laser, wire, saw . . . ), thus allowing to reproduce finally a complex surface with the stack of plates. It also allows the piece to be held or clamped firmly in order to perform machining or honing operations, accurate measurements, welding, for instance by friction or any other operation of maintenance, manufacturing or control. This is thus particularly suitable for operations on parts having complex or complicated shapes. In the case of a simple piece, the plurality of plates may be substantially perpendicular to the contact surface. By perpendicular is meant an angle of 90 degrees, advantageously or preferably +/−5 degrees, very advantageously or preferably +/−1 degree. In other words, the distribution of the contact all along the clamping surface of the edge reduces matting, thanks to the projection of the contact pressures on the entire edge.

Advantageously, the clamping surface of each clamping plate is normal or perpendicular to the side faces of the clamping plates.

This makes it possible to provide a holding device with a compact arrangement, a great adaptability and a great ease of manufacture. Indeed, it is the geometry obtained by a conventional cut: the edge is perpendicular to the lateral faces of the cut plate.

Advantageously, the plates include a marking and are ordered in order to pair the plates to a respective portion of the contact surface of the piece, so as to locate and perfectly fit the piece to be clamped.

By locating is meant determining the location of an object, the place where is situated. In particular, each plate must or should be facing a specific portion of the piece to be clamped. The marking makes it possible to stack the plates in the right order.

This makes it possible to provide a holding device with an excellent adaptability and adequacy to the part to be clamped, with a reduced contact pressure so as not to damage the part and to be able to hold it firmly and carry out any useful operation on the part to be clamped. This is also particularly advantageous in the case of the use of several holding devices on the same part to be clamped, so that each holding device can adapt to the shape of the part to be clamped, especially if the part to be clamped has different shapes at the places in contact with the holding devices. This is also particularly advantageous in the context of the reuse of the plurality of plates for a second operation or a maintenance operation on a same part, after a period of operation of the part according to its destination. It is then sufficient to store the plurality of plates for the time being.

Advantageously, the device further includes at least one jaw having a cavity arranged to receive at least a portion of the plurality of clamping plates.

This allows providing a clamping device with a jaw, in particular a movable jaw, in order to achieve an easy clamping of the piece to be clamped. The cavity of the jaw thus makes it possible to hold the claw.

Advantageously, the device further includes a device for adjusting or clamping (adjuster or clamp), such as a screw, a part or a mechanical assembly, such as a pin or a dowel, a jack or a rack to allow clamping or pinching or holding the plurality of clamping plates together or on the jaws or clamping or pinching the clamping plates on the piece.

This makes it possible to provide a holding device that is effective and adapted to the part to be clamped.

Advantageously, the device includes an adherent material arranged between the clamping plates of the plurality of clamping plates so as to bond and protect the clamping plates.

This makes it possible to provide an effective holding device with clamping plates bonded together, in particular by an injection of plastic or glue, and in which the clamping plates are protected from dirt. The clamping plates of the plurality of plates are thus jointed while being very easy to produce.

Advantageously, the device further includes:
at least one jaw having a cavity arranged to receive at least a portion of the plurality of clamping plates, and
at least one half-cylinder, arranged between the at least one jaw and the at least one claw, in order to allow the adjustment of the holding device to a misalignment of the part to be clamped in the holding device.

This makes it possible to provide a holding device that makes it possible to adapt to an angular positioning error of the part by virtue of the additional degree of freedom provided by the half-cylinder. It forms indeed a pivot connection between the jaw and the claw. The plates can also slide on each other. In other words, the plates are independent of each other. Advantageously, the half-cylinder has an axis perpendicular or substantially perpendicular to an axial direction of the piece to be clamped. Advantageously, the half-cylinder has an axis contained or substantially contained in a plane of each of the plates.

Advantageously, the plurality of clamping plates has a rear surface opposite to the piece to be clamped, of rounded shape so as to form another pivot connection between the jaw and the plurality of plates, or between the jaw and each plate. Advantageously, this other pivot connection has an axis parallel or substantially parallel to an axial direction of the piece to be clamped. Advantageously, this other pivot connection has an axis perpendicular or substantially perpendicular to a plane of each of the plates. Advantageously, at least one of the plates of the plurality of plates has a blockage of the degree of freedom of the other pivot connection so as to perform an angular indexing of the piece to be clamped.

This makes it possible to provide a holding device with an angular adaptation and with additional degrees of freedom in order to adapt perfectly to the part to be clamped and to the operations planned for the part to be clamped. This is also particularly interesting in the case of the use of several holding devices on the same part to be clamped. This also reduces or prevents over-determined constraints.

Advantageously, the holding device further includes:
at least one jaw having a cavity arranged to receive at least a portion of the plurality of clamping plates, and a plurality of support plates, each being arranged between one of the clamping plates and the at least one jaw.

This makes it possible to provide a holding device with great adaptability, making it possible to use the clamping pieces as exchangeable plates, in order to enhance or improve the interchangeability.

Advantageously, each support plate is located in the extended plane of the clamping plate that it supports by the edge, and the contact surfaces between the support plates and the clamping plates are staggered so as to form a kind of comb in which at least one side face of at least one clamping plate is supported by the side surface of the neighboring support plate or clamping plate.

Advantageously each support plate includes a shoulder and the support plates are arranged parallel to the clamping plates, so as to form a comb.

This allows providing a holding device, with great adaptability, in particular in adjusting as much as desired a space between the clamping plates. This adjusts the length of lever arm for a better grip of the piece.

Advantageously,
each clamping plate further includes a rear surface opposite to the clamping surface,
each support plate includes on its edge a support surface arranged to be in contact with the rear surface of one of the clamping plates,
the support surface of each support plate has a specific contact profile forming a counter-shape of one of the rear surfaces of the clamping plates.

This makes it possible to provide a holding device with great adaptability, in particular by providing shapes that make it possible to block certain clamping plates or, on the contrary, to leave some of them more free, and thus to adapt the holding device to the operation to be performed, and in particular to define an angular reference. In other words, the plates are independent of each other to allow relative sliding or pivoting.

Advantageously, the holding device further includes a protective device, such as a cover of rubber or polymer, or a sheet of soft metal to protect the contact surface of the piece to be clamped.

This makes it possible to provide a holding device with optimized clamping and to make up for errors or surface irregularities.

Advantageously, the holding device further includes a stacking or clamping stud, including a portion having a specific profile, each clamping plate including a central aperture, arranged to receive the stud and including an other rear surface on the side of the piece to be clamped, and the other rear surface having a rounded profile and presenting a counter-form of the specific profile of the stud, the stud being arranged to allow the clamping of the plurality of clamping plates together and to place the portion of the stud's specific profile in regard with the other rear surface of each clamping plate, so as to allow rotating adjustment of each clamping plate with respect to the piece to be clamped.

In other words, the stacking or clamping stud acts as a jaw, and the other rear surface of each of the clamping plates is arranged to be in contact and supported on the portion having a specific profile of the stud, especially when clamping the piece to be clamped. The specific profile of the stud and the corresponding other rear surface can be of other shape such as ellipse or bevel, so as to allow a linear adjustment, a sliding adjustment, a rotational adjustment or a combination thereof.

This makes it possible to propose a compact and economical clamping device, perfectly matching the surface of the piece to be clamped and limiting the damage to the piece to be clamped due to the clamping.

Some embodiments relate to a method of manufacturing a device for holding a piece to be clamped, including:
determination of a contact surface of the part to be clamped,
cutting for example by laser or water jet or machining each of a plurality of clamping plates in order to provide a clamping surface on the edge of each clamping plate, and
stacking the plurality of clamping plates to define or create a counter-shape of the contact surface of the piece to be clamped.

This makes it possible to provide a method of manufacturing a device for holding a piece that fits or adapts exactly to the shape of the piece to be clamped, and makes it possible to reduce the contact pressure on its contact surface and to block the piece in the appropriate place in order to stand the loads resulting from the operation performed on the part to be clamped. In addition, each clamping surface of each clamping plate can be specifically adapted to the portion of the contact surface of the piece to be clamped. In other words, this amounts to sub-dividing the contact surface into slices to define the shapes of the edges of the plates, in order to define a specific counter-shape for each plate perfectly adapted to the contact surface of the part to be clamped, so that each plate edge can respectively be in contact with the respective portion of the contact surface of the piece to be clamped. Otherwise formulated, it means to sub-divide the contact surface in contours to be clamped and determine the shape of each of the respectively corresponding clamping plates.

Advantageously, the determination of the contact surface of the part to be clamped is carried out using a three-dimensional scanning, as performed by a laser beam, an ultrasound scanner, a radio scan, or a probe.

This makes it possible to provide a holding device with a great adaptability to the part to be clamped.

Advantageously, the determination of the contact surface of the piece to be clamped is carried out using a file of a computer-aided design.

This makes it possible to provide an effective and inexpensive holding device.

Some embodiments relate to a method of holding a piece to be clamped, including:
providing a device for holding a piece to be clamped including a plurality of clamping plates stacked on each other and each including on their edge a clamping surface arranged to be in contact with a portion of a contact surface of the piece to be clamped, and
positioning the stack of clamping plates of the plurality of clamping plates with respect to the contact surface of the piece to be clamped, each clamping surface of each plate facing a respective portion of the contact surface of the piece to be clamped.

This makes it possible to provide a method for maintaining a piece to be clamped so as to reduce the contact pressure on the piece to be clamped and to adapt perfectly to the piece to be clamped as well as to the operation to be performed on the piece.

BRIEF DESCRIPTION OF THE FIGURES

Other features and advantages of some embodiments will appear more clearly on reading the following detailed description of some embodiments given by way of non-limiting example and illustrated by the accompanying drawings wherein:

FIG. 4 represents a part of two holding devices including half-cylinders in order to compensate for a misalignment of the part to be clamped, FIG. 5 shows a part of the holding device with a central clamping stud.

DETAILED DESCRIPTION OF EXEMPLARY EMBODIMENTS

Figure 1:
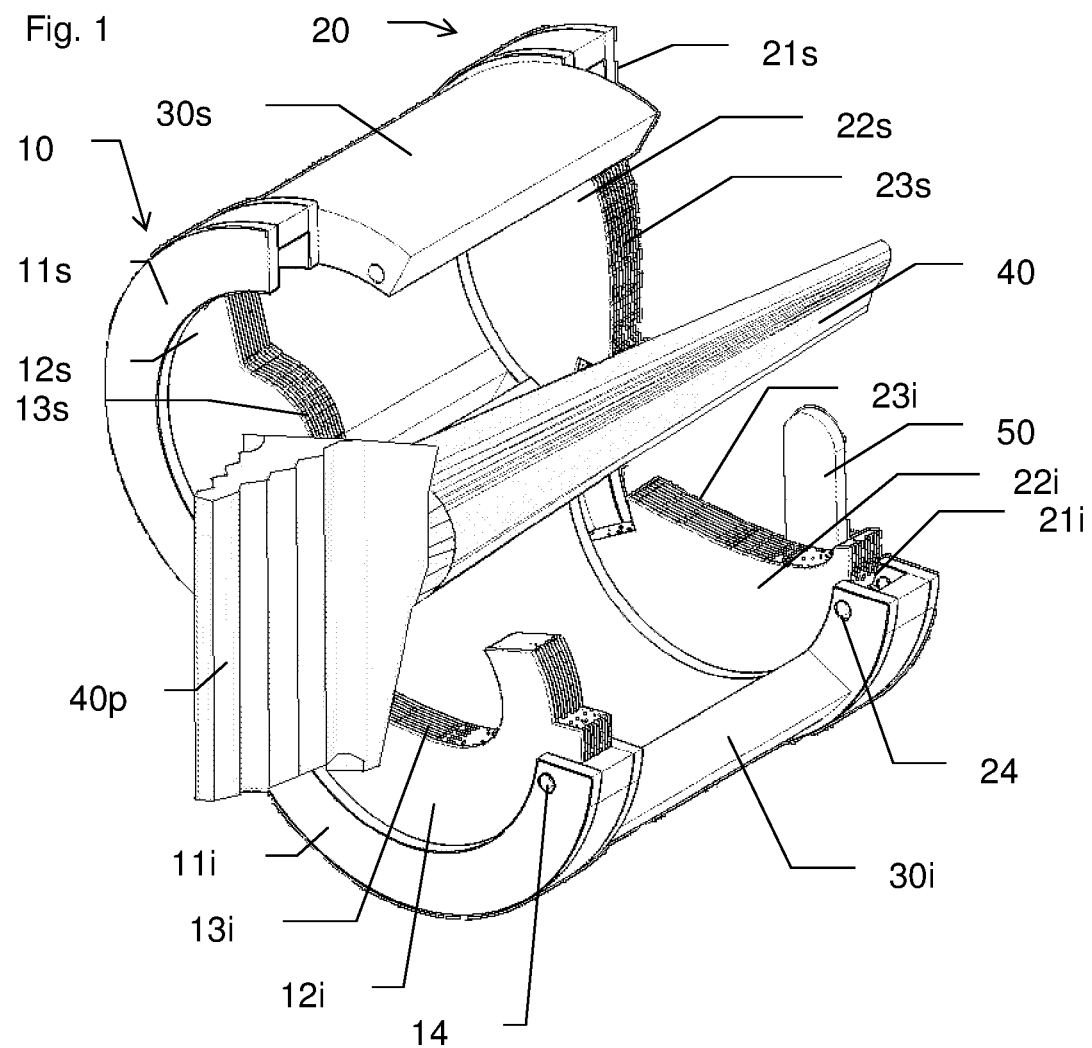
FIG. 1 represents two devices for holding a part to be clamped according to some embodiments, in which the devices are open.
Figure 2:
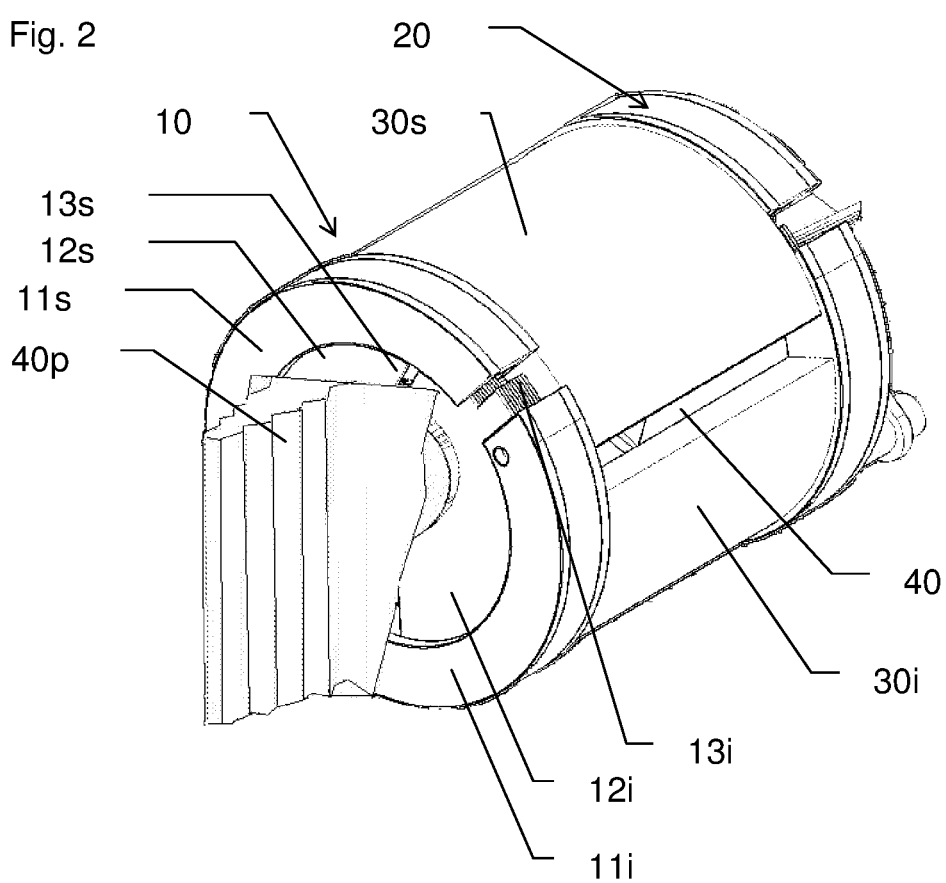
FIG. 2 represents two holding devices in which the devices are closed.
Figure 3:
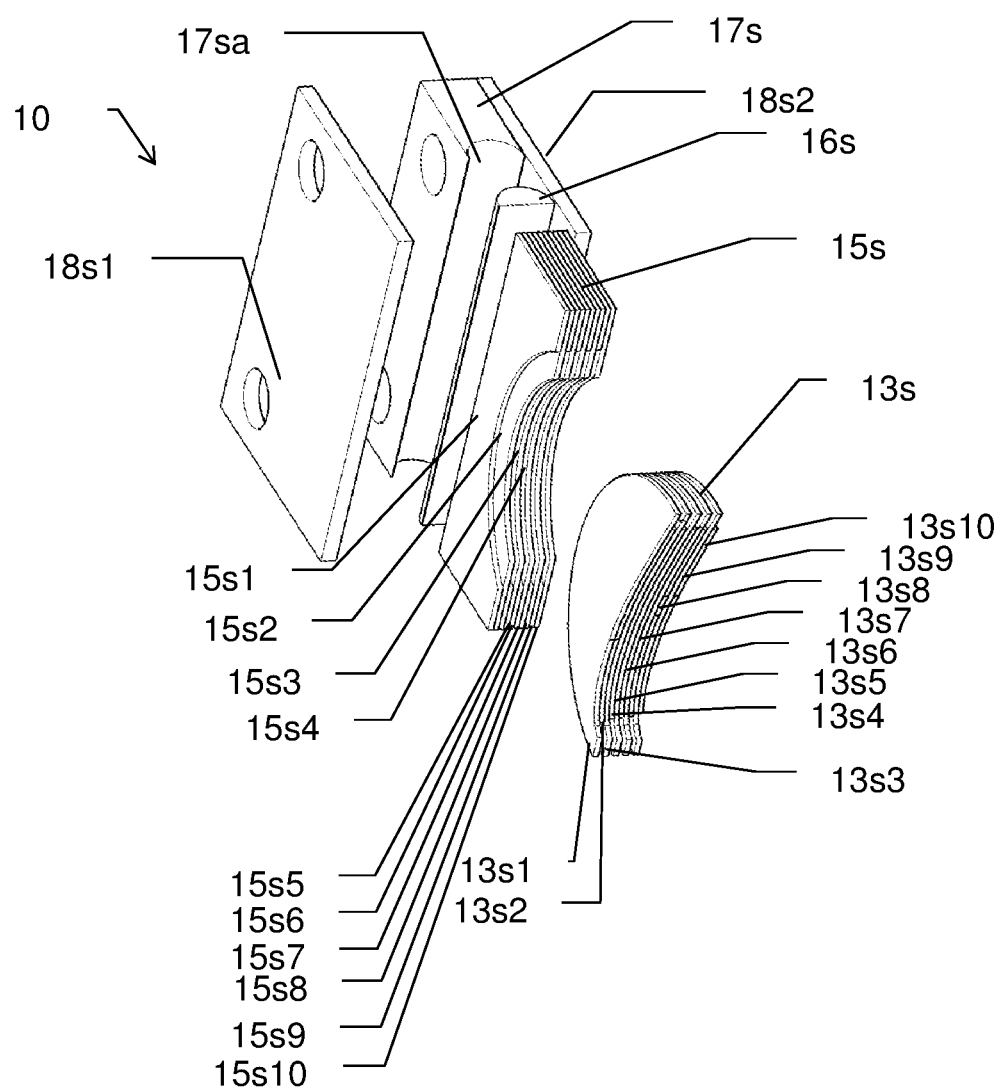
FIG. 3 shows a part of the holding device in exploded view.

FIGS. 1 and 2 correspond to a first embodiment, FIGS. 3 and 4 correspond to a second embodiment, and FIG. 5 shows a third embodiment of the presently disclosed subject matter.

FIG. 1 shows two devices for holding a piece to be clamped according to some embodiments, wherein the devices are open. The holding device 10 includes two jaws, a lower jaw 11$i$ and an upper jaw 11$s$, two claws, a lower claw 12$i$ and an upper claw 12$s$ respectively. Each claw includes or consists of a plurality of clamping plates, respectively a plurality of lower clamping plates 13$i$ for the lower claw 12$i$ and a plurality of upper clamping plates 13$s$ for the upper claw 12$s$. The jaws 11$i$ and 11 $s$, the claws 12$i$ and 12$s$ and the plates 13$i$ and 13$s$ may be made of steel. The plates 13$i$ and 13$s$ can also be made of other metals, such as softer metals in particular. It can be aluminum plates to be less aggressive.

It is the same for the second holding device 20, including two jaws, upper jaw 21$s$ and lower jaw 21$i$, and two upper claws, upper claw 22$s$ and lower claw 22$i$. Each upper claw 22$s$ and lower claw 22$i$ includes a plurality of clamping plates, upper clamping plates 23$s$ and lower clamping plates 23$i$ respectively.

The two holding devices 10 and 20 are separated by an upper spacer 30$s$ and a lower spacer 30$i$, connected to the upper jaws 11$5$, 21$s$ and lower jaws 11$i$, 21$i$, respectively, to ensure a space between the two holding devices 10, 20.

The holding devices are intended for clamping or holding a blade 40, such as a turbine blade, including a machined blade root 40$p$, also commonly called fir tree foot 40$p$. The holding devices make it possible to hold the blade 40 as in a mold in order to machine the foot 40$p$ of the blade or to carry out a campaign of precision measurements.

Each plurality of plates 13$s$, 13$i$, 23$s$, 23$i$ includes a stack of plates stacked one on top of the other, each plate including on an edge a clamping surface arranged to be in contact with a portion of a surface of contact of the part to be clamped, currently the blade 40. The clamping surface of each plate has a specific contact profile forming a counter-shape of the portion of the contact surface of the piece to be clamped. In other words, each plate is specifically adapted to the shape of the blade 40 in order to reduce the contact pressure on the part and to avoid damaging it. Thus, the plurality of plates fits perfectly or adapts exactly to the contact surface of the blade 40 in order to be able to hold it firmly and continuously along its entire edge.

It can thus be seen in FIG. 1 that the plurality of plates 13$i$, 13$s$, 23$i$, 23$s$ have different general shapes in order to adapt to the profile evolution of the blade 40 along a longitudinal direction and/or angular thereof. Each of the plates is also perfectly adapted to the profile evolution of the blade 40. Finally, the plates have a thickness of about 1 mm in order to provide a sufficient bearing surface, but this thickness can be adapted, especially in case of a strong variation of profile of the blade 40 in order to adapt each plate even more precisely with respect to the adjacent plates. The pluralities of plates 13$i$, 13$s$, 23$i$, 23$s$ are held or secured by pins 14, 24, and by the upper jaws 11$s$, 21$s$ and lower jaws 11$i$, 21$i$, so as to leave enough clearance for the plates to freely and adapt to the surface of the piece, the blade 40 shown in FIG. 1. Each of the plates has a rounded rear surface, opposite the clamping surface arranged to be in contact with the blade 40, to allow each plate to pivot enough to adapt to the contact surface of the blade 40 and adapt the angular orientation. In other words, each plate is independent of the adjacent plate(s). Finally, it is possible to provide a positioning pin 50 acting as an axial stop, to ensure the positioning of the blade 40.

It is thus possible to determine the contact surface of the piece to be clamped, in particular by scanning with the aid of a laser beam, a radio or ultrasound scan or a probe and export this shape by a computer-assisted design software, in order to adapt and cut by laser, water jet or machining each plate of the plurality of plates 13$i$, 13$s$, 23$i$, 23$s$.

It is then possible to close the holding devices 10, 20 on the blade 40 in order to hold it firmly, as shown in FIG. 2, and whose description follows.

FIG. 2 shows two holding devices in which the devices are closed. The holding devices 10, 20 are shown closed on the blade 40, to allow in particular the firm holding (clamping or tightening as in a machining tool) of blade 40, to then perform the machining of the foot of blade 40$p$ or any other operation deemed useful or desired in this embodiment.

The holding devices 10, 20 are spaced by the lower 30$i$ and upper 30$s$ spacers to provide the desired rigidity to the assembly.

The holding device 10 includes the lower jaws 11$i$ and upper jaws 11$s$, shown closed on the blade 40. The holding device 10 also includes the lower- and upper claws 12$i$ and 12$s$, each including the plurality of lower- and upper clamping plates 13$i$ and 13$s$.

The holding devices 10 and 20 of FIGS. 1 and 2 are arranged to be installed in a mandrel, but it is also possible to provide their installation in a vise or in another tool.

FIG. 3 shows a portion of the holding device in exploded view. The holding device 10 also includes a base piece 17$s$ arranged to form part of the jaw 11$s$ shown in FIGS. 1 and 2, and includes a rounded cavity 17$sa$. The holding device 10 further includes a half-cylinder 16$s$ having a rounded rear shape opposite to the piece to be clamped and arranged to come into contact with the rounded cavity 17$sa$ of the base part 17$s$ forming part of the jaw 11$s$.

The holding device 10 includes a plurality of clamping plates 13$s$, composed of a plurality of clamping plates 13$s$1, 13$s$2, 13$s$3, 13$s$4, 13$s$5, 13$s$6, 13$s$7, 13$s$8, 13$s$9, 13$s$10 stacked one on top of the other in the direction of their long side, and each having a rounded rear surface opposite a clamping surface arranged to be in contact with the blade 40.

The holding device 10 also includes a plurality of support plates 15$s$, including or consisting of support plates 15$s$1, 15$s$2, 15$s$3, 15$s$4, 15$s$5, 15$s$6, 15$s$7, 15$s$8, 15$s$9, 15$s$10 stacked on top of each other in the direction of one of their large sides. The support plates 15$s$1, 15$s$2, 15$s$3, 15$s$4, 15$s$5, 15$s$6, 15$s$7, 15$s$8, 15$s$9, 15$s$10 each include on their edge a support surface, arranged to be in contact with the rear surfaces of the plurality of clamping plates 13$s$, and having a counter-form thereof, rounded as shown in FIG. 3. The plurality of support plates 15s is arranged between the half-cylinder 16s of the base piece 17s of the jaw 11s and the plurality of clamping plates 13s.

The support plates 15s1, 15s2, 15s3, 15s4, 15s5, 15s6, 15s7, 15s8, 15s9, 15s10 and the clamping plates 13s1, 13s2, 13s3, 13s4, 13s5, 13s6, 13s7, 13s8, 13s9, 13s10 are independent of one another, so that they can slide/shift and adapt to the piece to be clamped, both thanks to the pivot formed by the rounded cavity 17s and the half-cylinder 16s, as thanks to the rounded rear surface of each independent clamping plate and the corresponding rounded counter-shape of each independent support plate, so as to achieve a clamping that perfectly fits the shape of the piece to be clamped.

It is possible to foresee support plates 15s1, 15s2, 15s3, 15s4, 15s5, 15s6, 15s7, 15s8, 15s9, 15s10 with their entire edge facing the clamping plates 13s1, 13s2, 13s3, 13s4, 13s5, 13s6, 13s7, 13s8, 13s9, 13s10 without a shoulder, but staggering the contact surfaces between the support plates 15s1, 15s2, 15s3, 15s4, 15s5, 15s6, 15s7, 15s8, 15s9, 15s10 and the support plates 13s1, 13s2, 13s3, 13s4, 13s5, 13s6, 13s7, 13s8, 13s9, 13s10 along a direction to the base member 17s, so as to provide a shape similar to the shoulder but using the lateral surface from the nearby support plate. The clamping plates 13s1, 13s2, 13s3, 13s4, 13s5, 13s6, 13s7, 13s8, 13s9, 13s10 are arranged to transmit the forces to the support plates 15s1, 15s2, 15s3, 15s4, 15s5, 15s6, 15s7, 15s8, 15s9 15s10 that are supporting them, and which are arranged to transmit the forces via the half-cylinder 16s to the base part 17s.

In an alternative embodiment, each support plate 15s1, 15s2, 15s3, 15s4, 15s5, 15s6, 15s7, 15s8, 15s9, 15s10 includes a shoulder for receiving the clamping plates 13s1, 13s2, 13s3, 13s4, 13s5, 13s6, 13s7, 13s8, 13s9, 13s10 and to define a spacing between the clamping plates 13s1, 13s2, 13s3, 13s4, 13s5, 13s6, 13s7, 13s8, 13s9, 13s10 thus forming a comb It may be necessary to provide at least one lateral guide 18s1, 18s2 for the support plates 15s1, 15s2, 15s3, 15s4, 15s5, 15s6, 15s7, 15s8, 15s9, 15s10 and the clamping plates 13s1, 13s2, 13s3, 13s4, 13s5, 13s6, 13s7, 13s8, 13s9, 13s10, and to choose the slenderness of the plates so as to avoid buckling. It is also possible to adjust the spacing and the thickness of the clamping plates 13s1, 13s2, 13s3, 13s4, 13s5, 13s6, 13s7, 13s8, 13s9, 13s10 by varying the thickness of the clamping plates 13s1, 13s2, 13s3, 13s4, 13s5, 13s6, 13s7, 13s8, 13s9, 13s10 and the support plates 15s1, 15s2, 15s3, 15s4, 15s5, 15s6, 15s7, 15s8, 15s9, 15s10 or their shoulder. It is also possible to provide intermediate foils of a material absorbing shocks and vibrations, such as foils of rubber or soft plastic depending on the spacing of the clamping plates 13s1, 13s2, 13s3, 13s4, 13s5, 13s6, 13s7, 13s8, 13s9, 13s10. It is also possible to perform a rubber molding to insert rubber between the clamping plates 13s1, 13s2, 13s3, 13s4, 13s5, 13s6, 13s7, 13s8, 13s9, 13s10 of the plurality of clamping plates 13s.

FIG. 4 shows a portion of two holding devices including half cylinders to compensate for misalignment of the piece to be clamped.

The holding devices 10 and 20 include respectively lower and upper jaws in which claws are arranged as previously presented. In particular, the claws include pluralities of upper clamping plates 13s, 23s, and lower clamping plates 13i, 23i and upper support plates 15s, 25s and lower support plates 15i, 25i, and upper lateral guides 18s1, 18s2, 28s1, 28s2 and lower lateral guides 18i1, 18i2, 28i1, 28i2. In addition, upper half-cylinders 16s, 26s and lower half-cylinders 16i and 26i are arranged between the upper base parts 17s, 27s and lower base parts 17i, 27i of the jaws of the holding devices 10, 20.

A blade 40, including its blade root 40p, is shown clamped between the holding devices 10, 20. The upper half cylinders 16s, 26s and lower half-cylinders 16i, 26i allow correcting an alignment error of the devices 10, 20. It is also possible to adapt the orientation of the holding devices 10, 20 thanks to the rounded rear shapes of the clamping plates 13s, 23s, 13i, 23i and the counter-forms of the respective support plates 15s, 25s, 15i, 25i.

FIG. 5 shows a portion of the holding device with a clamping stud according to some embodiments.

The holding device 10 includes two claws, a lower claw 12i and an upper claw 12s respectively. Each claw include or consists of a plurality of clamping plates, respectively a plurality of lower clamping plates 13i for the lower claw 12i and a plurality of upper clamping plates 13s for the upper claw 12s.

A clamping stud 60i, together with two nuts 61i and a spacer plate 62i allows clamping the plurality of lower plates 13i. The plurality of lower clamping plates 13i includes a central aperture 70i for receiving the clamping stud 60i, which is also machined with a shape corresponding to the counter-shape of the central opening 70i, so as to provide an internal jaw. It is the same with the plurality of upper clamping plates 13s including a central aperture 70s, held by a clamping stud 60s cooperating with two nuts 61s and a spacer plate 62s. The pluralities of clamping plates 13i, 13s form a space 100 intended to receive the part to be clamped not shown for the sake of clarity, but of which one recognizes the previously illustrated blade shape 40. The pluralities of clamping plates 13i, 13s abut against the clamping studs 60i, 60s in order to clamp the piece to be clamped. The functions of closing and general holding of the vise can be achieved by the clamping studs 60i, 60s.

In other words, the nuts 61i, 61s allow in collaboration with the stacking studs 60i, 60s, to limit the clearance between the clamping plates 13i, 13s so as to maintain these allowing a relative movement between the plates to adjust to the piece to be clamped.

The counter-shape of each of the plurality of clamping plates 13i, 13s on the side of the piece to be clamped is adapted to the contact surface of the piece to be clamped. The counter-shape of each of the pluralities of clamping plates 13i, 13s on the side of the central aperture 70i, 70s is adapted to the machined surface of the clamping studs 60i, 60s. In this way it is very easy to modify the plates of the pluralities of clamping plates 13i, 13s in order to adapt perfectly to the contact surface of the part to be clamped, while keeping identical the shapes of the central apertures 70i, 70s intended to receive the clamping studs 60i, 60s. It is also possible to provide several studs 60i, 60s per plurality of clamping plates 13i, 13s in order to achieve a mechanical adjustment of the assembly.

In addition, it is possible to foresee the machining of one or more of the clamping studs 60i, 60s in a rounded manner to allow each clamping plate of the plurality of clamping plates 13i, 13s to pivot and thus adapt to the contact surface of the piece to be clamped and adjust angularly. It is also possible to foresee a machining of one or more clamping studs 60i, 60s in a stepped way so as to block some of the plurality of clamp plates 13i, 13s and leave others free. It is also possible to foresee the machining specifically for each clamping stud 60i, 60s in order to adapt it to each plate of the plurality of clamping plates 13i, 13s. In other words, the clamping studs 60i, 60s act as jaws arranged at the center of the pluralities of plates 13i, 13s and having parts or portions receiving the pluralities of clamping plates 13i, 13s so as to allow the clamping of the piece to be clamped. Each plurality of plates 13i, 13s has a rear surface 13ix, 13sx opposite the piece to be clamped which is in contact with the respective clamping studs 60i, 60s. This rear surface 13ix, 13sx also found in the other embodiments is therefore in this embodiment arranged at the heart of the plurality of plates 13i, 13s, leaving a surface 13iy, 13sy free of clamping or unused for tightening the piece.

A method of manufacturing a holding device as previously described may include the steps of determining a contact surface of the piece, the blade 40, including the subdivision of this contact surface into contours to clamp and a determination of the shape of each of the clamping plates of the pluralities of clamping plates 13i, 13s, 23i, 23s. Once the determination of the surface of the clamping plates has been carried out, it may be necessary to cut, for example by a laser, a water jet or a machine-tool, each of the plates of the plurality of clamping plates 13i, 13s, 23i, 23s and mark each plate for identification to provide a clamping surface on the edge of each clamping plate. It may then be necessary to stack the plurality of clamping plates 13i, 13s, 23i, 23s according to the markings in order to define the counter-shape of the contact surface of the blade 40. An additional step can be added of determining a rear contact surface of each clamping plate to match it to the contact surface of the support plates 15s1, 15s2, 15s3, 15s4, 15s5, 15s6, 15s7, 15s8, 15s9, 15s10 or to their shoulder.

A method for holding the blade 40 may include the following steps of providing a holding device as previously described, and positioning the stack of clamping plates 13i, 13s, 23i, 23s with respect to the contact surface of the blade 40, each clamping surface of each plate facing a respective portion of the contact surface of the blade 40.

It will be understood that various modifications and/or improvements obvious to those of ordinary skill in the art can be made to some embodiments of the presently disclosed subject matter. In particular, reference is made to the possibility of modeling the counter-forms of the clamping plates as one likes according to the more or less complex shape of the part to be clamped, as well as the counter-forms of the support plates. In the same way, it is possible to hold some clamping plates blocked for example thanks to a square rear shape, and hold the other clamping plates more freely thanks to a rounded rear shape, in order to create a reference to the orientation of the piece to be clamped.

What is claimed is:

1. A holding device for clamping a piece to be clamped that includes a contact surface, the holding device comprising:
   at least one claw configured to contact the contact surface of the piece to be clamped, each claw of the at least one claw including a plurality of clamping plates, stacked on each other and each clamping plate of the plurality of clamping plates including on a respective edge a clamping surface arranged to be in contact with a corresponding portion of the contact surface of the piece to be clamped,
   at least one jaw defining a cavity arranged to receive at least a portion of the at least one claw, and
   at least one half-cylinder having a longitudinal axis parallel to a plane of each of the plurality of clamping plates, arranged between the at least one jaw and the at least one claw.

2. The holding device according to claim 1, wherein each clamping plate of the plurality of plates have a thickness of less than 3 mm.

3. The holding device according to claim 1, wherein the clamping surface of each clamping plate of the plurality of clamping plates has a specific contact profile forming a counter-shape of the corresponding portion of the contact surface of the piece to be clamped.

4. The holding device according to claim 1, wherein each clamping plate includes a marking and is arranged to match said each plate to a respective portion of the contact surface of the piece to be clamped, so as to locate and fit perfectly on the piece to be clamped.

5. The holding device according to claim 1,
   wherein each one of the plurality of clamping plates has a rear surface opposite to the piece to be clamped of rounded shape configured to be received by one of a plurality of support plates so as to form a pivot connection between the at least one claw and the plurality of clamping plates.

6. The holding device according to claim 1, further comprising:
   a plurality of support plates, each being arranged between one of the clamping plates and the at least one jaw in a direction of an extended plane of the one of the clamping plates.

7. The holding device according to claim 1, further comprising:
   a plurality of support plates, each one of the support plates being arranged between one of the clamping plates and the at least one jaw, wherein:
      each clamping plate further includes a rear surface opposite to the clamping surface,
      each support plate comprises on its edge a support surface arranged to be in contact with the rear surface of one of the clamping plates, and
      the support surface of each support plate has a specific contact profile forming a counter-shape of the rear surfaces of each of the clamping plates.

8. The holding device according to claim 1, wherein each clamping plate of the plurality of clamping plates is independent of the adjacent plate and/or capable of moving relatively to at least one adjacent plate.

9. A method of maintaining a piece to be clamped, comprising:
   providing a holding device for a piece to be clamped including a plurality of clamping plates stacked on each other and each including on their edge a clamping surface arranged to be in contact with a corresponding portion of a contact surface of the piece to be clamped;
   positioning the plurality of clamping plates with respect to the contact surface of the piece to be clamped, each clamping surface of each plate facing a respective portion of the contact surface of the piece to be clamped;
   receiving at least a portion of the plurality of clamping plates in a cavity of at least one jaw; and
   arranging half-cylinder, having a longitudinal axis parallel to a plane of each of the plurality of clamping plates, between the at least one jaw and the plurality of clamping plates.

* * * * *